United States Patent
Kurono et al.

(10) Patent No.: US 8,390,183 B2
(45) Date of Patent: Mar. 5, 2013

(54) SPARK PLUG AND METHOD FOR MANUFACTURING SPARK PLUG

(75) Inventors: Hirokazu Kurono, Nagoya (JP); Toshitaka Honda, Nagoya (JP); Hiroki Takeuchi, Aichi (JP); Takeshi Mitsuoka, Kounan (JP); Kuniharu Tanaka, Komaki (JP); Kazunari Miyata, Hashima (JP); Katsuya Takaoka, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 445 days.

(21) Appl. No.: 12/598,482

(22) PCT Filed: Mar. 26, 2009

(86) PCT No.: PCT/JP2009/001362
§ 371 (c)(1), (2), (4) Date: Nov. 2, 2009

(87) PCT Pub. No.: WO2009/119098
PCT Pub. Date: Oct. 1, 2009

(65) Prior Publication Data
US 2010/0136867 A1    Jun. 3, 2010

(30) Foreign Application Priority Data
Mar. 27, 2008  (JP) .................. 2008-084306

(51) Int. Cl.
*H01T 21/02*    (2006.01)
(52) U.S. Cl. .......................... 313/118; 445/7
(58) Field of Classification Search .................. 313/118, 313/139–143; 501/127; 445/7
See application file for complete search history.

(56) References Cited

U.S. PATENT DOCUMENTS

| | | | |
|---|---|---|---|
| 6,559,579 B2* | 5/2003 | Ito et al. | 313/143 |
| 2006/0186780 A1* | 8/2006 | Ogata et al. | 313/118 |

FOREIGN PATENT DOCUMENTS

| | | |
|---|---|---|
| EP | 1 005 125 A2 | 5/2000 |
| JP | 7-12969 B2 | 2/1995 |
| JP | 7-17436 B2 | 3/1995 |
| JP | 2000-272957 A | 10/2000 |
| JP | 2000-313657 A | 11/2000 |
| JP | 2001-2464 A | 1/2001 |
| JP | 2001-313148 A | 11/2001 |
| JP | 2001-335360 A | 12/2001 |
| WO | 2005/033041 A1 | 4/2005 |

* cited by examiner

*Primary Examiner* — Anh Mai
*Assistant Examiner* — Brenitra M Lee
(74) *Attorney, Agent, or Firm* — Sughrue Mion, PLLC

(57) ABSTRACT

This invention has an object to provide a spark plug exhibiting high withstand voltage characteristics and high strength at high temperature, formed by an alumina-based sintered body prepared with excellent processability and high productivity, and a method for manufacturing the spark plug. This invention relates to a spark plug 1 including an insulator 3, wherein the insulator 3 includes a dense alumina-based sintered body having an average crystal particle diameter of 1.50 µm or more, and the alumina-based sintered body contains Si, a Group 2 element component containing Ba and a Group 2 element other than those, and a rare earth element component, such that a ratio of a content S of the Si component to a total content of the content S and a content A of the Group 2 element component is 0.60 or more, and a method for manufacturing the spark plug 1 prepared through a grinding-shaping process in which the insulator 3 is ground before burning to shape the same.

8 Claims, 3 Drawing Sheets

(a)

REAR END DIRECTION

FRONT END DIRECTION (b)

FRONT END DIRECTION

REAR END DIRECTION

SPARK PLUG AND METHOD FOR MANUFACTURING SPARK PLUG

TECHNICAL FIELD

This invention relates to a spark plug and a method for manufacturing a spark plug. More particularly, the invention relates to a spark plug including an insulator exhibiting high withstand voltage characteristics and high strength at high temperature formed by an alumina-based sintered body prepared with excellent processability and high productivity, and a method for manufacturing the spark plug.

BACKGROUND ART

An alumina-based sintered body comprising alumina as a main component has excellent withstand voltage characteristics, heat resistance and mechanical strength, and is inexpensive. Therefore the alumina-based sintered body is used as ceramic products such as an insulator of a spark plug, and a multilayer wiring board of IC package. The alumina-based sintered body was formed by sintering a mixed powder containing a sintering aid such as a three-component sintering aid comprising $SiO_2$—CaO—MgO. For example, Patent Document 1 describes a method for manufacturing a high insulating high alumina porcelain composition, which comprises molding and burning a mixed raw material powder includes at least one additive selected from $Y_2O_3$, $ZrO_2$ and $La_2O_3$, or a solid solution composite oxide of at least one additive selected from $Y_2O_3$, $ZrO_2$ and $La_2O_3$, and alumina, and alumina fine particle powder having a particle diameter of 0.5 μm or less, thereby preparing a sintered body, the content of the additive being 0.5 to 10 wt % to the sintered body.

Patent Document 2 describes "an alumina porcelain constituted of a sintered body having a porosity of 6% by volume or less, the sintered body comprising alumina ($Al_2O_3$) having an average particle diameter of 1 μm or less, and at least one of compound and mixture of at least one of yttria ($Y_2O_3$), magnesia (MgO), zirconia ($ZrO_2$) and lanthanum oxide ($La_2O_3$), formed in grain boundary and $Al_2O_3$."

However, in the case of forming an insulator for the spark plug by using the alumina-based sintered body described above, the sintering aid (mainly Si component) is present as a low melting point glass phase in grain boundary of alumina crystal particles after sintering. Therefore, under a usage environment of the spark plug, for example, a high temperature environment at about 700° C., the low melting point glass phase softens, and withstanding voltage characteristics of the insulator are decreased. On the other hand, a low melting point glass phase in an alumina-based sintered body can be decreased by decreasing the amount of the sintering aid added. In this case, an insulator is not densified, or even though densified seemingly, many pores remain in grain boundary constituted by alumina crystal particles, and withstanding voltage characteristics of the insulator are decreased.

The conventional alumina-based sintered body has a low melting glass phase or pores (residual pores) present in grain boundary. In the case of forming an insulator of a spark plug with such an alumina-based sintered body, when high voltage for generating spark discharge is applied to a spark plug in high temperature environment of about 700° C., a low melting point glass phase softens, or electric field concentrates in residual pores, and an insulator may suffer breakdown (spark penetration).

An insulator or a material thereof for a spark plug is proposed for the purpose of preventing decrease in withstand voltage characteristics and/or breakdown. For example, Patent Document 3 describes "an alumina-based sintered body containing at least a rare earth element (hereinafter referred to as "RE") component, the alumina-based sintered body having a theoretical density ratio of 95% or more."

Patent Document 4 describes "an insulator for a spark plug, in which the content ratio in terms of oxide of Al component is 95 to 99.8 mass % when the sum of the constituent components is defined as 100 mass %, which contains a rare earth element and Si component in amounts such that a ratio ($R_{RE}/R_{Si}$) of a content ratio in terms of oxide of the rare earth element ($R_{RE}$) to a content ratio in terms of oxide of the Si component ($R_{Si}$) is 0.1 to 1.0, in which the number of alumina particles having the maximum length present on a cut surface of 1 $mm^2$ of 10 μm or more and an aspect ratio of 3 or more is less than 10."

Patent Document 5 describes "an alumina porcelain composition using alumina as a main component, comprising a composite sintered body of the alumina as the main component, and a composition of at least one element selected from Al, Si, Mg and rare earth elements, wherein when the amount of alumina as the main component is 100 parts by weight, the amount of the composition of at least one element selected from Al, Si, Mg and rare earth elements is 5 parts by weight or less."

In recent years, increase in occupation space of inlet and exhaust valves in a combustion chamber and 4-valve formation is investigated in internal combustion engines having a spark plug mounted thereon with increase in power of internal combustion engines. For this reason, a spark plug itself and its insulator tend to be reduced-sized (small diameter) and to decrease its thickness. Therefore, an insulator having decreased thickness is required to have high mechanical strength in high temperature environment of about 700° C. in addition to prevention of decrease in withstand voltage characteristics and breakdown. However, the insulators of spark plug or their materials described in Patent Documents 3 to 5 are not investigated on mechanical strength in high temperature environment (hereinafter referred to as "strength at high temperature").

On the other hand, an alumina-based sintered body constituting an insulator of a spark plug is generally prepared by compression molding a raw material powder prepared to obtain a molded article (hereinafter referred to as an "unburned molded article"), grinding and shaping the unburned molded article into a desired shape and a desired thickness, and then burning the same. Therefore, an alumina-based sintered body forming an insulator of a spark plug is required to have high processability, particularly grinding processability, for enabling to decrease thickness, in addition to the above excellent characteristics when forming an insulator. In particular, recent insulators have a small thickness. Therefore, an unburned molded article becoming an alumina-based sintered body is required to have excellent processability, particularly grinding processability. The reason for this is that where an unburned molded article has poor processability and its processing time is prolonged, productivity of an alumina-based sintered body and thus a spark plug is decreased.

To achieve high productivity of an alumina-based sintered body by improving processability of an unburned molded article, it is effective to use a raw material powder having a large particle diameter such that an alumina-based sintered body has an average crystal particle diameter of 1.50 μm or more. However, a raw material powder having a large particle diameter has low sinterability, and an alumina-based sintered body obtained by burning such a raw material powder cannot sufficiently be satisfied with the characteristics, particularly mechanical strength, required as an insulator of a spark plug in some cases.

Thus, in the present situation that processability of an unburned molded article and the characteristics, particularly mechanical strength, as a sintered body have a contradictory relationship, the characteristics, particularly mechanical strength, when forming an insulator are considered important, and processability of an unburned molded article capable of forming an insulator is not investigated. Thus, it has not been easy to form an insulator having desired shape and thickness by an industrially inexpensive method.

Patent Document 1: JP-B-7-17436
Patent Document 2: JP-B-7-12969
Patent Document 3: JP-A-2001-2464
Patent Document 4: JP-A-2001-335360
Patent Document 5: WO 05/033041 pamphlet

DISCLOSURE OF THE INVENTION

Problem to be Solved by the Invention

This invention has an object to provide a spark plug including an insulator exhibiting high withstand voltage characteristics and high strength at high temperature, formed by an alumina-based sintered body prepared with excellent processability and high productivity, and a method for manufacturing the spark plug.

Means for Solving the Problem

The present invention as a means for solving the problem provides a spark plug comprising: a center electrode; a substantially cylindrical insulator provided on a periphery of the center electrode; and a grounding electrode arranged such that one end thereof faces the center electrode through a spark discharge gap, wherein the insulator comprises a dense alumina-based sintered body having an average crystal particle diameter $D_A(Al)$ of 1.50 μm or more, and wherein the alumina-based sintered body contains Si component, a Group 2 element (2A) component containing Mg and Ba as essential components and further containing at least other one element excluding Mg and Ba in Group 2 elements in a periodic table based on a recommendation of IUPAC 1990, and a rare earth element (RE) component, such that a ratio of a content S (mass % in terms of oxide) of the Si component to a total content (S+A) of the content S and a content A (mass % in terms of oxide) of the Group 2 element (2A) component is 0.60 or more.

Further, the present invention as a means for solving the problem provides a method for manufacturing the spark plug in which the insulator is prepared through a grinding-shaping process of grinding the insulator before burning to shape the same.

Advantage of the Invention

As described above, the insulator of a spark plug according to this invention includes a dense alumina-based sintered body having an average crystal particle diameter $D_A(Al)$ of 1.50 μm or more, and the alumina-based sintered body contains Si component, a Group 2 element (2A) component containing Mg and Ba as essential components and further containing other one element excluding Mg and Ba, in Group 2 elements in the periodic table, and a rare earth element (RE) component, such that a ratio of a content S (mass % in terms of oxide) of the Si component to the total content (S+A) of the content S and a content A (mass % in terms of oxide) of the Group 2 element (2A) component is 0.60 or more. The alumina-based sintered body having such a constitution effectively prevents formation of low melting point glass phase and retention of pores in grain boundary while maintaining high processability, particularly grinding processability, of an unburned molded articles obtained by molding a raw material powder, and becomes dense even in the case of using a raw material powder having a relatively large particle diameter which has conventionally been difficult to be compacted by burning such that an average crystal particle diameter $D_A(Al)$ of the alumina-based sintered body is 1.50 μm or more. As a result, the alumina-based sintered body can exhibit high withstand voltage characteristics when forming an insulator of a spark plug and can improve strength at high temperature when forming an insulator of a spark plug. Therefore, according to this invention, it is possible to provide a spark plug including an insulator exhibiting high withstand voltage characteristics and high strength at high temperature formed by an alumina-based sintered body prepared with excellent processability and high productivity, and a method for manufacturing the spark plug.

BRIEF DESCRIPTION OF DRAWINGS

FIG. 1 is an explanatory view explaining a spark plug as one example of the spark plug according to this invention, in which FIG. 1(a) is a whole explanatory view of a partial cross section of a spark plug as one example of the spark plug according to this invention, and FIG. 1(b) is an explanatory view of cross section showing a main part of a spark plug as one example of the spark plug according to this invention.

DESCRIPTION OF REFERENCE SIGNS

Figure 1:
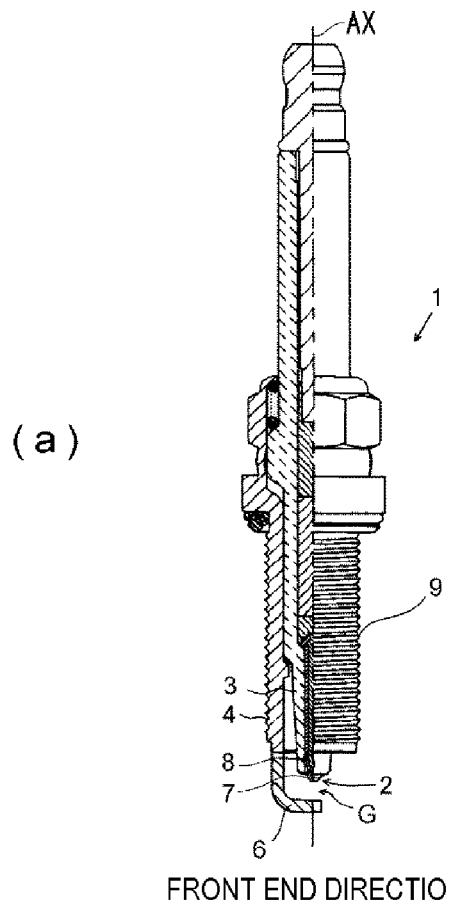
Figure 1:
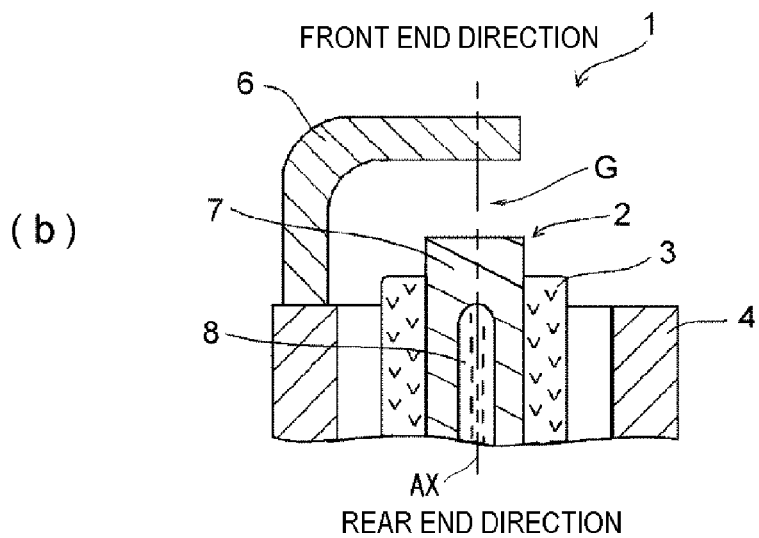

1: Spark plug
2: Center electrode
3: Insulator
4: Metal shell
5: Noble metal tip
6: Grounding electrode
7: Outer member
8: Inner member
9: Screw portion
G: Spark discharge gap
20: Withstand voltage measuring device
21: Disc-shaped test piece
22: Heating box
23a, 23b: Electrode
24a, 24b, 28a, 28b: Alumina-made insulator cylinder
25: Sealing glass
26: Electric heater
27: High voltage generating apparatus (CDI power source)

BEST MODE FOR CARRYING OUT THE INVENTION

The spark plug according to this invention includes a center electrode, a substantially cylindrical insulator provided on the periphery of the center electrode, and a grounding electrode provided such that one end thereof faces the center electrode through a spark discharge gap. The spark plug according to this invention is not particularly limited in other constitution so long as the spark plug has such a constitution, and can have the conventional various constitutions.

A spark plug as one example of the spark plug according to this invention is shown in FIG. 1. FIG. 1(a) is a whole explanatory view of a partial cross section of a spark plug 1 as one example of the spark plug according to this invention, and FIG. 1(b) is an explanatory view of a cross section showing a main part a spark plug 1 as one example of the spark plug according to this invention. FIG. 1(a) is explained as that the downside on paper is a front end direction of an axis line AX, and the upside on paper is a rear end direction of an axis line AX, and FIG. 1(b) is explained as that the upside on paper is a front end direction of an axis line AX, and the downside on paper is the rear end direction of the axis line AX.

As shown in FIG. 1(a) and FIG. 1(b), the spark plug 1 includes a substantially rod-shaped center electrode 2, a substantially cylindrical insulator 3 provided on the periphery of the center electrode 2, a cylindrical metal shell 4 holding the insulator 3, and a grounding electrode 6 provided such that one end thereof faces a front end surface of the center electrode 2 through a spark discharge gap G, other end thereof being joined to an end surface of the metal shell 4.

The metal shell 4 has a cylindrical shape, and is formed so as to hold the insulator 3 by housing the insulator 3 therein. A screw portion 9 is formed on the periphery in a front end direction of the metal shell 4, and the spark plug 1 is mounted on a cylinder head of an internal combustion engine not shown by utilizing the screw portion 9. In the case that the spark plug 1 is mounted on a recent internal combustion engine having high power, a nominal diameter of the screw portion is normally adjusted to 10 mm or less. The metal shell 4 can be formed by a conductive iron steel material such as low carbon steel.

The center electrode 2 is formed by an outer member 7 and an inner member 8 formed so as to be concentrically embedded in an axial core portion inside the outer member 7. The center electrode 2 is fixed to an axis hole of the insulator 3 in a state that its front end portion is projected from a front end surface of the insulator 3, and is insulated and held to the metal shell 4. The outer member 7 of the center electrode 2 can be formed by Ni-based alloy having excellent heat resistance and corrosion resistance. The inner member 8 of the center electrode 2 can be formed by a metal material having excellent thermal conductivity such as copper (Cu) or nickel (Ni).

The grounding electrode 6 is formed into, for example, a prismatic body, and one end thereof is joined to the end surface of the metal shell 4. The grounding electrode 6 is bent into substantially L-shape in the middle thereof, and the shape and structure of the grounding electrode 6 are designed such that the front end portion thereof is positioned in an AX direction of axis line of the center electrode 2. When the grounding electrode 6 is designed like this, the grounding electrode 6 is arranged such that one end thereof faces the center electrode 2 through the spark discharge gap G. The spark discharge gap G is a gap between the front end surface of the center electrode 2 and the surface of the grounding electrode 6, and the spark discharge gap G is generally set to 0.3 to 1.5 mm. The grounding electrode 6 is exposed to higher temperature than the center electrode 2. Therefore, the grounding electrode 6 is preferably formed by, for example, Ni-based alloy having further excellent heat resistance and corrosion resistance than those of Ni-based alloy forming the center electrode 2.

The insulator 3 is held on the inner peripheral portion of the metal shell 4 through talc and/or packing (not shown), and has an axis hole holding the center electrode 2 along an AX direction of an axis line of the insulator 3. The insulator 3 is fixed to the metal shell 4 in a state that the end in the front end direction of the insulator 3 is projected from the front end surface of the metal shell 4. In the case that the nominal diameter of the screw portion 9 in the metal shell 4 is adjusted to 10 mm or less, the insulator 3 in the front end surface of the metal shell 4 must be set to a small thickness of 0.7 to 1.0 mm. However, in this invention, the alumina-based sintered body constituting the insulator 3 has a constitution described hereinafter. Therefore, the insulator 3 can be adjusted to the above thickness with excellent processability and high productivity.

In the spark plug 1, the insulator 3 is formed by the dense alumina-based sintered body having an average crystal particle diameter $D_A(Al)$ of 1.50 μm or more. The alumina-based sintered body contains Si component, a Group 2 element (2A) component containing Mg and Ba as essential components and further containing at least other one element excluding Mg and Ba in Group 2 elements (2A) in the periodic table based on the recommendation of IUPAC 1990, and a rare earth element (RE) component, in the specific ratio described above.

The alumina-based sintered body contains Al component, mainly alumina ($Al_2O_3$), as the main component. The term "main component" in this invention means a component having the highest content. When the Al component is contained as the main component, withstand voltage characteristics, heat resistance and mechanical properties of the sintered body are excellent.

The content of the Al component in the alumina-based sintered body is preferably from 92.5 mass % to 97.0 mass %, and particularly preferably from 93.0 mass % to 95.5 mass %, when the whole mass of the alumina-based sintered body is defined as 100 mass %. When the content of the Al component is fallen with the above range, the content of a sintering aid in a raw material powder before sintering for the formation of the alumina-based sintered body becomes an appropriate proportion, and therefore, the alumina-based sintered body obtained by sintering the raw material powder before sintering is dense. As a result, when the content of the Al component is fallen within the above range, formation of a low melting point glass phase and retention of pores are less in grain boundary, and an insulator formed by the alumina-based sintered body exhibits high withstand voltage characteristics. In this invention, the content of the Al component is defined as mass % in terms of an oxide when converted to "alumina ($Al_2O_3$)" which is an oxide of the Al component.

The alumina-based sintered body contains Si component. The Si component is a component derived from a sintered aid, and is present as, for example, an oxide and an ion in the alumina-based sintered body. The Si component generally melts at the sintering to form liquid phase and functions as a sintering aid promoting densification of a sintered body. After sintering, the Si component forms low melting point glass phase in grain boundary of alumina crystal particles. However, the alumina-based sintered body contains other specific components described hereinafter in addition to the Si component, and therefore preferentially forms high melting point glass phase and the like, rather than low melting point glass phase, together with the other components. Therefore, in this invention, the Si component is contained in the alumina-based sintered body in a content that does not substantially form the low melting point glass phase and forms high melting point glass phase and the like together with the other components. Specifically, the content S of the Si component in the alumina-based sintered body is adjusted to a proportion such that the content S is 0.60 or more to the total content (S+A) of the content S (mass % in terms of oxide) and a content A (mass % in terms of oxide) of the Group 2 element (2A) component described hereinafter. That is, the Si component is contained in the alumina-based sintered body in a proportion such that the ratio S/(S+A) of the content S to the total content (S+A) of the content S and the content A of the Group 2 element (2A) component is 0.60 or more. Where the ratio S/(S+A) of the contents is less than 0.60, the Si component before sintering exhibits only the function as a sintering aid, and the Si component after sintering forms low melting point glass phase. Therefore, high withstand voltage characteristics may not be exhibited when forming an insulator. Furthermore, where the ratio S/(S+A) of the contents is less than 0.60, the Group 2 element (2A) component before sintering also exhibits only the function as a sintering aid, and the effect that the Group 2 element (2A) is contained in the raw material powder before sintering and the alumina-based sintered body is not sufficiently obtained. Therefore, high withstand voltage characteristics and high strength at high temperature may not be exhibited when forming an insulator. The ratio S/(S+A) of the contents is preferably 0.62 or more, and particularly preferably 0.65 or more, from the point that withstand voltage characteristics and strength at high temperature can further be improved when forming an insulator even though a raw material powder having a relatively large particle diameter is used. The upper limit of the ratio S/(S+A) of the contents is not particularly limited. However, because the alumina-based sintered body contains the Group 2 element (2A) component described hereinafter as the essential component, the upper limit is less than 1.0, and preferably 0.8 or less.

The content S of the Si component is adjusted so as to satisfy the ratio S/(S+A) of the contents. However, the content S is preferably 1.0 to 4.0 mass % when the whole mass of the alumina-based sintered body is defined as 100 mass %, in that a dense alumina-based sintered body is obtained even though a raw material powder having a relatively high particle diameter is used. In this invention, the content S of the Si component is defined as mass % in terms of oxide when converted to "$SiO_2$" which is an oxide of the Si component.

The alumina-based sintered body contains the Group 2 element (2A) component derived from a sintering aid. The Group 2 element (2A) component may be a component containing Mg as an essential component and further containing at least other one element excluding Mg in Group 2 elements (2A) in the periodic table based on the recommendation of IUPAC 1990, and in this invention, it is important that the Group 2 element (2A) component contains Mg and Ba as essential components and further contains at least other one element excluding Mg and Ba in Group 2 elements (2A) in the periodic table based on the recommendation of IUPAC 1990. As the Group 2 elements (2A), Mg, Ca, Sr and Ba are preferable from the standpoint of low toxicity. As the Group 2 element (2A) component in this invention, Mg component, Ba component and a component containing at least other one element excluding Mg component and Ba component, that is, a component of at least one element selected from the group consisting of Ca component and Sr component are preferable. More specifically, the Group 2 element (2A) component containing Mg component, Ba component and Ca component, the Group 2 element (2A) component containing Mg component, Ba component and Sr component, and the Group 2 element (2A) component containing Mg component, Ba component, Ca component and Sr component are preferred.

The Mg component is a component derived from a sintering aid, is present as, for example, an oxide and an ion in the alumina-based sintered body, and functions as a sintering aid similar to the Si component before sintering. The Ba component, the Ca component and the Sr component are components derived from a sintering aid, and are present as, for example, oxides and ions in the alumina-based sintered body. Those components function as a sintering aid similar to the Mg component before sintering, and simultaneously have the function to improve strength at high temperature of the alumina-based sintered body obtained. Therefore, the alumina-based sintered body containing thus-functioned Mg component and Ba component, and at least other one element component excluding the Mg component and the Ba component, particularly the Ca component and/or the Sr component, as the Group 2 element (2A) component exhibits high withstand voltage characteristics and high strength at high temperature when forming an insulator 3, and additionally can decrease a sintering temperature at the burning.

The content A of the Group 2 element (2A) component in the alumina-based sintered body is adjusted such that the ratio S/(S+A) of the contents is 0.60 or more. Where the ratio S/(S+A) of the contents is less than 0.60, high withstand voltage characteristics and high strength at high temperature may not be exhibited when forming an insulator as described before. The content A of the Group 2 element (2A) component is adjusted so as to satisfy the ratio S/(S+A) of the contents. The content A is preferably 0.1 to 2.5 mass %, and particularly preferably 0.5 to 2.0 mass %, when the whole mass of the alumina-based sintered body is defined as 100 mass %, in that a dense alumina-based sintered body having excellent withstand voltage characteristics and strength at high temperature when forming an insulator is obtained even though a raw material powder having a relatively high particle diameter is used.

When the content A of the Group 2 element (2A) component is satisfied with the ratio S/(S+A) being 0.60 or more, the content M of the Mg component, the content B of the Ba component, the content C of the Ca component and the content Sr of the Sr component are not particularly limited, and are appropriately adjusted. The content M of the Mg component is a proportion (that is, the ratio M/A of the contents) of preferably from 0.050 to 0.45, and more preferably from 0.050 to 0.35, to the content A of the Group 2 element (2A) component.

Each content of Mg component, Ba component, Ca component and Sr component is required to be satisfied with the ratios S/(S+A) and M/A of the contents. In the case that those components are contained in the alumina-based sintered body, for example, the content of M of Mg component is preferably 0.01 to 0.4 mass %, the content B of Ba component is preferably 0.1 to 1.6 mass %, and particularly preferably 0.18 to 1.6 mass %, the component C of Ca component is preferably 0.2 to 0.9 mass %, and the content Sr of Sr component is preferably 0.2 to 0.9 mass % when the whole mass of the alumina-based sintered body is defined as 100 mass %. In this invention, in the case that the alumina-based sintered body does not contain either of Ca component or Sr component, the content C or the content Sr is naturally 0 mass %. In this invention, each content of the Group 2 element (2A) component is defined as mass % in terms of oxide when converted to its oxide "(2A)O". Specifically, the content M of Mg component is defined as mass % in terms of oxide when converted to "MgO" which is an oxide of Mg component, the content B of Ba component is defined as mass % in terms of oxide when converted to "BaO" which is an oxide of Ba component, the content C of Ca component is defined as mass % in terms of oxide when converted to "CaO" which is an oxide of Ca component, and the content Sr of Sr component is defined as mass % in terms of oxide when converted to "SrO" which is an oxide of Sr component. Furthermore, the content A of a Group 2 element (2A) component is the total content of each of the Group 2 element (2A) components. Specifically, the content A is the total content of the content M of Mg component, the content B of Ba component, the content C of Ca component and the content Sr of Sr component.

The alumina-based sintered body contains a rare earth element (RE) component derived from a sintering aid. The rare earth element (RE) component is a component containing Sc, Y and lanthanoid element, and is specifically Sc component, Y component, La component, Ce component, Pr component, Nd component, Pm component, Sm component, Eu component, Gd component, Tb component, Dy component, Ho component, Er component, Tm component, Yb component and Lu component. The rare earth element (RE) component is present as an oxide, ion, etc., in the alumina-based sintering body. When the rare earth element (RE) component is contained at the sintering, the component suppresses particle growth of alumina from being excessively generated at the sintering, and additionally, forms RE-Si system glass (rare earth glass) in grain boundary, thereby increasing a melting point of grain boundary glass phase. When the insulator 3 is formed, withstand voltage characteristics are improved, and a strength at high temperature is also improved.

The rare earth element (RE) component may be each component described before, but is preferably at least one component selected from the group consisting of La component, Pr component and Nd component. It is considered that La component, Pr component and Nd component have a large ion radius of each element of La, Pr and Nd, forms crystal phase having high melting point coupled with Si component, and additionally, easily forms crystal phase of RE-β-alumina structure (hereinafter simply referred to as "RE-β-alumina crystal phase") having very high melting point of about 2,000° C. coupled with the Al component and as the case may be, with the Group 2 element (2A) component. Therefore, when at least one component selected from the group consisting of La component, Pr component and Nd component is contained as the rare earth element (RE) component, the RE-β-alumina crystal phase is formed, and as a result, withstand voltage characteristics and the strength at high temperature can further be improved when forming the insulator 3.

Therefore, the RE-β-alumina crystal phase preferably has a composition represented by a compositional formula: $RE(2A)_x(Al)_yO_z$ (wherein x, y and z are x=0 to 2.5, y=11 to 16, and z=18 to 28, respectively). In the case of containing at least one component selected from the group consisting of La component, Pr component and Nd component as the rare earth element (RE) component, the RE-β-alumina crystal phase particularly preferably has a composition represented by the above compositional formula. When the RE-β-alumina crystal phase has a composition represented by the above compositional formula, withstand voltage characteristics and the strength at high temperature can further be improved when forming the insulator 3. The x, y and z in the above compositional formula can be an integer and a decimal, within above each range. The x, y and z are preferably selected such that x is a range of from 0 to 1.5, y is a range of from 11 to 14, and z is a range of from 18 to 24. The compositional formula showing the composition of the RE-β-alumina crystal phase may be, for example, $RE(2A)Al_{13}O_{19}$, $REAl_{11}O_{18}$, etc.

Whether or not the RE-β-alumina crystal phase has a composition satisfying the compositional formula can be confirmed by, for example, subjecting the RE-β-alumina crystal phase present in the alumina-based sintered body to elemental analysis using energy dispersion X-ray analyzer (EDX) (EDX: Genesis 400, manufactured by EDAX, detector: SUTW 3.3R TEM) provided with transmission electron microscope (TEM) (HD-2000, manufactured by Hitachi, Ltd.) under the following measurement conditions.

<Measurement Conditions>

(1) Accelerating voltage: 200 kV (2) Irradiation mode: HR (spot size: about 0.3 nm)

(3) Measurement result of energy dispersion X-ray analyzer (EDX) is calculated mass % in terms of oxide. Oxides other than Group 2 element (2A) component, rare earth element (RE) component and Al component, and having 1 mass % in terms of oxide or less are considered impurities. The total mol number of Group 2 element (2A) component is x, the total mol number of Al component is y; and mol number of theoretical oxide component in the oxygen defect-free case is z when mol number of he rare earth element (RE) component is 1.

The RE-β-alumina crystal phase is sufficient to be present in the alumina-based crystal phase, and the site of presence thereof is not particularly limited. The RE-β-alumina crystal phase is preferably present up to the inside of the alumina-based sintered body, and is particularly preferably present in secondary particle grain boundary and/or triple point of alumina crystal particles.

The presence of the RE-β-alumina crystal phase can be identified with, for example, X-ray diffraction using JCPDS card. Regarding Pr and Nd, JCPDS card of RE-β-alumina is not present. Therefore, direct identification with X-ray diffraction is impossible. However, ion radii of $Pr^{3+}$ and $Nd^{3+}$ are substantially equal to ion radius of $La^{3+}$, and therefore show X-ray diffraction spectrum similar to JCPDS card (No. 33-699) of La-β-alumina. Therefore, the presence of Pr-β-alumina and Nd-β-alumina can be confirmed by comparing with JCPDS card of La-β-alumina.

When the RE-β-alumina crystal phase has too large particle diameter when the RE-β-alumina crystal phase present in the alumina-based sintered body is considered as a granular crystal particle, the RE-β-alumina crystal phase has the possibility to decrease the strength at high temperature. Therefore, to exhibit higher strength at high temperature when forming the insulator 3, a particle diameter of the RE-β-alumina crystal phase is appropriately adjusted.

For example, in this invention, it is preferred that the average crystal particle diameter $D_A(RE)$ of the RE-β-alumina crystal phase and the average crystal particle diameter $D_A(Al)$ of alumina are satisfied with the following condition (1), and it is particularly preferred that those diameters are satisfied with the following condition (1) in the case that the rare earth element (RE) component is at least one component selected from the group consisting of La component, Pr component and Nd component. When those diameters are satisfied with the following condition (1), the alumina-based sintered body can exhibit higher strength at higher temperature without decreasing withstand voltage characteristics. In the following condition (1), $D_A(RE)/D_A(Al)$ is preferably 0.2 to 2, and particularly preferably 0.2 to 1.5.

$$0.2 \leq D_A(RE)/D_A(Al) \leq 3.0 \qquad \text{Condition (1)}$$

In this invention, it is preferred that of the RE-β-alumina crystal phases contained in the alumina-based sintered body, RE-β-alumina crystal phases in which its crystal particle diameter $D_E(RE)$ and the average crystal particle diameter $D_A(Al)$ of alumina are satisfied with the following condition (2) are 3 or less, and it is particularly preferred that RE-β-alumina crystal phases satisfying the following condition (2) in the case that the rare earth element (RE) component is at least one component selected from the group consisting of La component, Pr component and Nd component, are 3 or less. When the RE-β-alumina crystal phases satisfying the following condition (2) are 3 or less, the alumina-based sintered body can exhibit higher strength at higher temperature without decreasing withstand voltage characteristics. The RE-β-alumina crystal phases satisfying the following condition (2) are preferably 2 or less, and particularly preferably 1 or less.

$$D_E(RE)/D_A(Al) \geqq 2 \quad \text{Condition (2)}$$

The crystal particle diameter $D_E(RE)$ and the average crystal particle diameter $D_A(RE)$ can be obtained as follows. For example, a surface or an optional cross-section of an alumina-based sintered body is mirror-polished. The mirror-polished surface is subjected to a thermal etching treatment at a temperature 100° C. lower than the burning temperature of the alumina-based sintered body for 10 minutes. The treated surface is observed with a scanning electron microscope (SEM), and the observation region is photographed at 2,000-fold magnification. When the image obtained is subjected to binarization process (alternatively called two-tone process) under the following binarization process and conditions using an image analysis software WinROOF (manufactured by Mitani Corporation), the RE-β-alumina crystal phase is shown as "light color region", and alumina is shown as "deep color region". The crystal particle diameter $D_E(RE)$ of the RE-β-alumina crystal phase is a value obtained by that, assuming that the "light color region" extracted by the binarization process is crystal particle of one RE-β-alumina crystal phase, a surface area of each "light color region" is calculated, and a diameter corresponding to a circle of each "light color region" is calculated from the surface area. The average crystal particle diameter $D_A(RE)$ of the RE-β-alumina crystal phase is an arithmetic average value of the crystal particle diameter $D_E(RE)$ thus calculated. The average crystal particle diameter $D_A(Al)$ of Alumina is described later.

<Binarization Process and Condition>

(1) On the image (horizontal 1280 pixel and vertical 1024 pixel) obtained by photographing the treated surface, secondary electron image and reflected electron image are confirmed. In the case that "light color aggregated region" comprising aggregate of 2 or more "light color regions" or 2 or more adjacent "light color regions" is present in the reflected electron image, a line is drawn on the boundary (corresponding to grain boundary of each crystal) in each "light color region", and the boundary of each "light color region" is clarified.

(2) To improve an image of the reflected electron image, the image of the reflected electron image is smoothened while maintaining the edge of the "light color region".

(3) "Threshold" in the binarization process for extracting only "light color region" from the reflected electron image is set. More specifically, a graph having a horizontal axis of brightness and a vertical axis of frequency is prepared from the image of the reflected electron image.

(4) The extraction of the "light color region" is conducted by selecting an optional region (horizontal 40 μm and vertical 30 μm) in the reflected electron image and extracting the "light color region" present in the image of the region.

(5) To improve image quality of the region selected, that is, the "light color region" extracted, treatment for filling holes appeared on the region selected is conducted.

(6) In the image of the region selected, the "light color region" having a diameter of 10 pixel or less is removed.

(7) Thus, each "light color region" is extracted.

The range of the average crystal particle diameter $D_A(RE)$ of the RE-β-alumina crystal phase is not particularly limited so long as the condition (1) is satisfied or the RE-β-alumina crystal phases satisfying the condition (2) are 3 or less. The average crystal particle diameter $D_A(RE)$ is preferably 0.5 to 4.5 μm, and particularly preferably 0.7 to 4.0 μm. When the RE-β-alumina crystal phase has the average crystal particle diameter $D_A(RE)$ in the above range, when forming the insulator 3, withstand voltage characteristics and the strength at high temperature can be achieved in combination in a high level.

The RE-β-alumina crystal phase can use RE-β-alumina itself as a raw material powder. However, anisotropic growth of the RE-β-alumina particles is remarkable at the sintering, and as a result, densification of the alumina-based sintered body may be impaired. Therefore, the RE-β-alumina crystal phase is preferably precipitated and formed in the course of burning. For example, the RE-β-alumina crystal phase can be precipitated and formed by sintering a raw material powder containing the Si component and the Group 2 element (2A) component in the content ratio S/(S+A) of 0.60 or more in the presence of the rare earth element (RE) component, particularly at least one component selected from the group consisting of La component, Pr component and Nd component.

To precipitate the RE-β-alumina crystal phase satisfying the condition (1) and/or 3 or less RE-β-alumina crystal phases satisfying the condition (2), when, for example, the content of the rare earth element (RE) component is adjusted, more specifically, the content of the rare earth element (RE) component is decreased, both "$D_A(RE)/D_A(Al)$" of the condition (1) and "the number of the RE-β-alumina crystal phase satisfying $D_E(RE)/D_A(Al) \geqq 2$" of the condition (2) become small or are decreased.

The content R of the rare earth element (RE) component in the alumina-based sintered body is not particularly limited and is required to a content of an extent capable of forming the RE-β-alumina crystal phase in the case that the rare earth element (RE) component is, for example, La component, Pr component or Nd component. When the whole mass of the alumina-based sintered body is defined as 100 mass %, the content R of the rare earth element (RE) component is preferably 0.5 to 2.0 mass %, regardless of the rare earth element (RE) component being La component, Pr component or Nd component.

In this invention, the content R of the rare earth element (RE) component in the alumina-based sintered body is defined as mass % in terms of oxide when converted into an oxide of each component. Specifically, the Ce component is defined as mass % in terms of oxide when converted to the Ce component "$CeO_2$", the Pr component is defined as mass % in terms of oxide when converted to "$Pr_6O_{11}$", and the rare earth element (RE) component other than the Ce component and the Pr component is defined as mass % in terms of oxide when converted to "$RE_2O_3$". When plural rare earth element (RE) components are contained, the content R is the total content of the content of each component.

In the alumina-based sintered body, the Si component, the Group 2 element (2A) component and the rare earth element (RE) component are required to be contained such that the ratio S/(S+A) of the contents is 0.60 or more. The total content of the content S of Si component, the content A of Group 2 element (2A) component and the content R of rare earth metal element (RE) component is preferably from 3.0 mass % to 7.5 mass %, and particularly preferably from 3.5 mass % to 7.0 mass %, when the whole mass of the alumina-based sintered body is 100 mass %. When the total content is fallen within the above range, the alumina-based sintered body obtained becomes dense, and an insulator formed by the alumina-based sintered body exhibits high withstand voltage characteristics.

The alumina-based sintered body contains Al component, Si component, a Group 2 element (2A) component and a rare earth element (RE) component, and substantially consists of the Al component, the Si component, the Group 2 element (2A) component and the rare earth element (RE) component. The term "substantially" used herein means that components other than the above components are not positively contained by addition and the like. However, each component of the alumina-based sintered body may contain slight amounts of unavoidable various impurities. It is preferred to remove those impurities as much as possible. However, the reality is, those impurities cannot completely be removed. Therefore, the alumina-based sintered body may contain unavoidable impurities in a range that the object of this invention is not impaired, in addition to each component described above. The unavoidable impurities that may be contained in the alumina-based sintered body include Na, S and N. Contents of those unavoidable impurities are better to be small. For example, when the total mass of Al component, Si component, a Group 2 element (2A) component and a rare earth element (RE) component is 100 parts by mass, the contents of the unavoidable impurities are 1.0 part by mass or less.

Thus, the alumina-based sintered body substantially consists of the above components, but may contain small amounts of other components such as B component, Ti component, Mn component and Ni component, in addition to the above Al component, Si component, Group 2 element (2A) component and rare earth element (RE) component.

The alumina-based sintered body containing the above components has an average crystal particle diameter $D_A(Al)$ of 1.50 µm or more. In short, the crystal particles constituting the alumina-based sintered body have an average crystal particle diameter $D_A(Al)$ of 1.50 µm or more. That is, the raw material powder containing Al component, Si component, Group 2 element (2A) component and rare earth element (RE) component, particularly the raw material powder having the contents of Si component and the Group 2 element (2A) component adjusted to the above specific proportions is efficiently liquid phase-sintered at the sintering, and the crystal particles having an average crystal particle diameter $D_A(Al)$ of 1.50 µm or more are formed. As a result, a highly densified alumina-based sintered body is obtained while maintaining high processability of an unburned molded article obtained by molding the raw material powder even though, for example, a relatively coarse alumina powder having a crystal average particle diameter of 1.4 µm or more is used as the raw material powder. Therefore, according to this invention, the object to provide a spark plug including an insulator exhibiting high withstand voltage characteristics and high strength at high temperature formed by an alumina-based sintered body with high productivity while maintaining high processability of an unburned molded article obtained by molding the raw material powder can be achieved. Thus, the dense alumina-based sintered body containing each of the above components and having an average crystal particle diameter $D_A(Al)$ of 1.50 µm or more can achieve both high withstand voltage characteristics and high strength at high temperature in a high level when forming an insulator 3 while maintaining high processability of an unburned molded article. The average crystal particle diameter $D_A(Al)$ of the crystal particles constituting the alumina-based sintered body is preferably 2.0 µm or more in that both withstand voltage characteristics and strength at high temperature can be achieved in higher level without sacrificing high processability of an unburned molded article. In this invention, the upper limit of the average crystal particle diameter $D_A(Al)$ is not particularly limited. However, where the upper limit is too large, densification of the alumina-based sintered body is decreased, and many pores may be formed. Therefore, the upper limit can be set to, for example, 4.5 µm, considering densification properties.

When the average crystal particle diameter $D_A(Al)$ of the crystal particles is set to less than 1.50 µm to obtain a dense alumina-based sintered body, a very fine powder of less than about 1.4 µm is generally required to use as a raw material powder, particularly as an alumina powder. However, when the fine raw material powder is burned to prepare an alumina-based sintered body, the alumina-based sintered body becomes dense. However, an unburned molded article obtained by molding the fine raw material powder has poor grinding processability, and in some cases, the unburned molded article cannot be shaped into desired shape and thickness by industrially inexpensive methods such as grinding processing by resinoid wheel, and grinding processing by lathe. Thus, the conventional alumina-based sintered body could not improve both densification properties and processability of an unburned molded article. However, according to this invention, the alumina-based sintered body becomes dense while maintaining high processability of an unburned molded article as described before, and can achieve both withstand voltage characteristics and strength at high temperature in a high level.

The crystal particles having an average crystal particle diameter $D_A(Al)$ of 1.50 µm or more in the alumina-based sintered body are substantially alumina crystal particles, and are shown as "deep color region" in an image analysis photograph as described before. The average crystal particle diameter $D_A(Al)$ of the crystal particles in the alumina-based sintered body can be obtained by observation with a scanning electron microscope (SEM) as same as the crystal particle diameter $D_E(RE)$ described before. Specifically, the average crystal particle diameter $D_A(Al)$ is calculated as follows. A surface or an optional cross section of an alumina-based sintered body is mirror-polished. The mirror-polished surface is subjected to a thermal etching treatment at a temperature 100° C. lower than the burning temperature of the alumina-based sintered body for 10 minutes. The treated surface is observed with a scanning electron microscope (SEM). Particle diameters of "deep color regions" represented by "binarization" described above are measured with an intercept method. Those values are subjected to arithmetic average.

Thus, the alumina-based sintered body is dense despite of having an average crystal particle diameter of 1.50 µm or more. Specifically, the alumina-based sintered body has a bulk density of 3.75 g/cm³ or more. When the bulk density is 3.75 g/cm³ or more, the presence of pores capable of becoming fracture origin is extremely decreased, and withstand voltage characteristics when forming an insulator 3 are excellent. The bulk density of the alumina-based sintered body is more preferably 3.78 g/cm³ or more in that withstand voltage characteristics when forming an insulator 3 are further excellent. The upper limit of the bulk density of the alumina-based sintered body is not particularly limited, but can be, for example, 3.95 g/cm³. The bulk density of the alumina-sintered body is obtained according to the measurement method of "bulk density $\sigma_b$" defined in JIS R1634 (1998).

The alumina-based sintered body is a dense body having an average crystal particle diameter $D_A(Al)$ of 1.50 µm or more, and contains Si component; a Group 2 element (2A) component containing Mg as an essential component and further containing at least other one element excluding Mg in Group 2 elements in the periodic table based on the recommendation of IUPAC 1990, preferably a Group 2 element (2A) component containing Mg and Ba as essential components and further containing at least other one element excluding Mg and Ba, in the Group 2 elements; and a rare earth element (RE) component, such that a ratio of a content S (mass % in terms of oxide) of the Si component to the total content (S+A) of the content S and a content A (mass % in terms of oxide) of the Group 2 element (2A) component is 0.60 or more. Therefore, the alumina-based sintered body becomes dense by effectively preventing formation of low melting point glass phase and retention of pores in grain boundary while maintaining high processability, particularly grinding processability, of an unburned molded article obtained by molding the raw material powder even in the case of using a raw material powder having a relatively large particle diameter which has conventionally been difficult to densify by burning, so as to have its average crystal particle diameter $D_A(Al)$ of 1.50 μm or more. As a result, the alumina-based sintered body can exhibit high withstand voltage characteristics when forming an insulator of a spark plug and additionally can improve strength at high temperature when forming an insulator of a spark plug.

In particular, the alumina-based sintered body has excellent processability of the unburned molded article and can easily be prepared with a desired shape and a desired thickness by the industrially inexpensive methods. Therefore, the alumina-based sintered body is particularly preferred as an insulator 3 used in a spark plug including the insulator 3 having a small size and decreased thickness. Furthermore, the alumina-based sintered body exhibits high withstand voltage characteristics and high strength at high temperature when forming an insulator, and is therefore particularly preferred as a spark plug including the insulator 3 having a small size and decreased thickness, and the insulator 3 used in a spark plug used in internal combustion engines having high power.

Therefore, the insulator formed by the alumina-based sintered body having excellent processability of the unburned molded article and capable of grinding as desirable can exhibit high withstand voltage characteristics at high temperature of about 700° C. and can exhibit high strength at high temperature of about 700° C. Thus, when an insulator is formed by the alumina-based sintered body prepared with excellent processability of an unburned molded article and with high productivity, the object to provide a spark plug including an insulator exhibiting high withstand voltage characteristics and high strength at high temperature can be achieved.

The alumina-based sintered body is obtained by sintering the raw material powder satisfying the above composition, and is prepared through a grinding-shaping step of grinding the raw material powder satisfying the above composition before burning, and shaping the same. For example, the alumina-based sintered body can be manufactured by a process of preparing a raw material powder by mixing an Al compound powder, an Si compound powder, a Group 2 element (2A) compound powder and a rare earth element (RE) compound powder in the specific proportion; a step of molding the raw material powder into an unburned molded article having a given shape; a step of grinding and shaping the unburned molded article obtained into a desired shape; and burning the unburned molded article thus shaped at a temperature in a range of 1,500 to 1,700° C. for 1 to 8 hours. The term "specific proportion" used herein means a proportion that the content ratio S/(S+A) in the sintered body obtained is 0.60 or more. When the raw material powder is passed through the grinding-shaping step and burned under the above burning conditions, the proportion of each component, particularly the proportions of Si component and a Group 2 element (2A) component, in the sintered body obtained can be adjusted to the above range, and a dense sintered body having an average crystal particle diameter $D_A(Al)$ of 1.50 μm or more can be obtained, even though a raw material powder having a relatively large particle diameter is used.

More specifically, an Al compound powder, an Si compound powder, a Group 2 element (2A) compound powder and a rare earth element (RE) compound powder as raw material powders are mixed in specific proportions such that each content thereof (the whole mass of raw material powders is defined as 100 mass %) is substantially the same content as each content of each component converted from those compound powders in the alumina-based sintered body obtained, and a hydrophilic binder and a solvent are added to and mixed with the resulting mixture. Thus, slurry is prepared.

The Al compound powder is not particularly limited so long as a compound converts into Al component by burning, and an alumina ($Al_2O_3$) powder is generally used. The Al compound powder realistically contains unavoidable impurities such as Na. Therefore, high purity powder is preferably used. For example, purity of the Al compound powder is preferably 99.5% or more. The Al compound powder generally uses a powder having an average particle diameter of from 0.1 to 1 μm to obtain a dense alumina-based sintered body. In this invention, when the alumina-based sintered body has the above composition, the alumina-based sintered body is highly densified. Therefore, a powder having a relatively large average particle diameter exhibiting high processability when forming an unburned molded article can be used as the raw material powder. For example, a raw material powder having an average particle diameter of 1.4 to 5.0 μm can be used. The average particle diameter is a value measured by a laser diffraction method (LA-750, manufactured by HORIBA).

The Si compound powder is not particularly limited so long as a compound converts into Si component by burning. Examples of the powder include various inorganic powders such as oxide (including composite oxide), hydroxide, carbonate, chloride, sulfate, nitrate and phosphate of Si. Specific example of the powder includes $SiO_2$ powder. In the case of using a powder other than an oxide as the Si compound powder, the amount of the powder used is recognized by mass % in terms of oxide when converted to oxide. Purity and average particle diameter of the Si compound powder are basically the same as the Al compound powder.

The Group 2 element (2A) compound powders are not particularly limited so long as compounds convert into the Group 2 element (2A) component by burning, that is, a compound converting into Mg component and a component containing at least one other element excluding Mg in Group 2 elements, preferably a compound converting into Mg component, Ba component and a component containing at least other one element excluding the Mg component and the Ba component, and particularly preferably a compound converting into Mg component, Ba component and a component containing at least one element component selected from the group consisting of Ca component and Sr component. Examples of the Group 2 element (2A) compound powder include various inorganic powders such as oxides (including composite oxide), hydroxides, carbonates, chlorides, sulfates, nitrates and phosphates of at least two Group 2 elements (RE) containing Mg, preferably at least three Group 2 elements (RE) containing Mg and Ba. Specifically, the Mg compound powder includes MgO powder and $MgCO_3$ powder, the Ba compound powder includes BaO powder and $BaCO_3$ powder, the Ca compound powder includes CaO powder and $CaCO_3$ powder, and the Sr compound powder includes SrO powder and $SrCO_3$ powder. In the case of using a powder other than an oxide as the Group 2 element (2A) compound powder, the amount of the powder used is recognized by mass % in terms of oxide when converted to oxide so as to satisfy the proportion in the alumina-based sintered body obtained. Purity and average particle diameter of the Group 2 element (2A) compound powder are basically the same as the Al compound powder.

The Group 2 element (2A) compound powder is a component containing an Mg compound powder and at least one element compound powder excluding Mg in Group 2 elements (RE). A component containing Mg compound powder, Ba compound powder and at least other one element compound powder excluding the Mg compound powder and the Ba compound powder, that is, at least one element compound powder selected from the group consisting of Ca compound powder and Sr compound powder, is preferred. Specific examples of the preferred Group 2 element (2A) compound powder include a Group 2 element (2A) compound powder containing Mg compound powder, Ba compound powder and Ca compound powder, Group 2 element (2A) compound powder containing Mg compound powder, Ba compound powder and Sr compound powder, and Group 2 element (2A) compound powder containing Mg compound powder, Ba compound powder, Ca compound powder, and Sr compound powder.

The rare earth element (RE) compound powder is not particularly limited so long as a compound converts into a rare earth element (RE) component by burning. Examples of the powder include powders of an oxide of rare earth element (RE) and its composite oxide. In the case of using a powder other than an oxide as the rare earth element (RE) compound powder, the amount of the powder used is recognized by mass % in terms of oxide when converted to oxide, so as to satisfy the proportion in the alumina-based sintered body obtained. Purity and average particle diameter of the rare earth element (RE) compound powder are basically the same as the Al compound powder.

Those raw material powders are generally mixed for 8 hours or more. Where the mixing time of the raw material powders is less than 8 hours, mixing state of the raw material powders is not highly uniform and the sintered body obtained cannot highly be densified.

Examples of the hydrophilic binder include polyvinyl alcohol, water-soluble acryl resin, gum arabic and dextrin. Examples of the solvent include water and alcohol. Those hydrophilic binders and solvents can be used alone or as mixtures of two or more thereof. The proportion of the hydrophilic binder and water used is that when the raw material powder is 100 parts by mass, the amount of the hydrophilic binder is 0.1 to 5 parts by mass (preferably 0.5 to 3 parts by mass). When water is used as the solvent, the amount of water used is 40 to 120 parts by mass (preferably 50 to 100 parts by mass).

The slurry thus obtained can be adjusted to have an average particle diameter of, for example, 1.4 to 5.0 μm. The slurry thus obtained is spray dried with a spray dry method or the like to granulate into particles having an average particle diameter of 50 to 200 μm (preferably 70 to 150 μm). The average particle diameter is a value measured with a laser diffraction method (LA-750, manufactured by HORIBA).

The granulated material is molded to obtain an unburned molded article. The unburned molded article obtained is ground and shaped. The unburned molded article is formed by the granulated material having a relatively large particle diameter. Therefore, the unburned molded article has excellent processability and can easily be shaped into a desired shape with high productivity.

The unburned molded article thus ground and shaped into a desired shape is burned in the atmosphere at 1,500 to 1,700° C. (more preferably 1,550 to 1,650° C.) for 1 to 8 hours (more preferably 3 to 7 hours) to obtain an alumina-sintered body. Where the burning temperature is lower than 1,500° C., the alumina-based sintered body cannot sufficiently be densified. Where the burning temperature exceeds 1,700° C., alumina particles are liable to grow abnormally during burning, and withstand voltage characteristics and mechanical strength of the alumina-based sintered body obtained tend to be decreased. Furthermore, where the burning time is shorter than 1 hour, the alumina-based sintered body cannot sufficiently be densified. Where the burning time exceeds 8 hours, alumina particles abnormally grow during burning, and withstand voltage characteristics of the alumina-based sintered body obtained tend to be decreased.

When the thus-obtained unburned molded article having the above composition is sintered, an alumina-based sintered body having the average crystal particle diameter $D_A(Al)$ and the bulk density fallen within the above ranges can be obtained. The alumina-based sintered body thus produced with excellent processability and high productivity is dense and effectively prevents formation of low melting glass phase and retention of pores in grain boundary, thereby having excellent withstand voltage characteristics and strength at high temperature, as described before. Furthermore, the alumina-based sintered body obtained has RE-β-alumina crystal phase satisfied with at least of one of the condition (1) and the condition (2) described before, or having the composition represented by the above compositional formula. In particular, in the case that the rare earth element (RE) component is at least one component selected from the group consisting of the above-described La component, Pr component and Nd component, the alumina-based sintered body has the RE-β-alumina crystal phase. Therefore, the alumina-based sintered body is particularly suitable as the insulator 3 having a small size and decreased thickness, and the insulator 3 of a spark plug for internal combustion engines having high power. If desired, the alumina-based sintered body may again be shaped. Thus, the alumina-based sintered body and the insulator 3 for a spark plug 1, including the alumina-based sintered body can be prepared.

The spark plug 1 is produced, for example, as follows. An electrode material such as Ni-based alloy is processed into a given shape to prepare a center electrode 2 and/or a grounding electrode 6. Preparation and processing of the electrode material can continuously be conducted. For example, a melt of Ni-based alloy having a desired composition is prepared using a vacuum melting furnace, an ingot is prepared from each melt by vacuum casting, and the ingot is subjected to hot processing, drawing process and the like to appropriately adjust to have a given shape and a given size. Thus, the center electrode 2 and/or the grounding electrode 6 can be prepared. An inner member 8 can be inserted in an outer member 7 molded into a cap shape, and the center electrode 2 can be formed by plastic processing such as extrusion processing.

One end portion of the grounding electrode 6 is joined to an end surface of a metal shell 4 formed into a given shape by plastic processing, with electric resistance welding or the like, if desired, followed by washing with about 10% hydrochloric acid, water or the like. The insulator 3 having given shape and size is formed by the alumina-based sintered body through the grinding-shaping step of grinding before burning the raw material powder satisfying the composition and shaping the same, the center electrode 2 is assembled to the insulator 3 by the conventional method, and the insulator 3 is assembled to the metal shell 4 having the grounding electrode 6 joined thereto. The front end surface of the grounding electrode 6 is bent to the center electrode 2 side, so that one end of the grounding electrode 6 faces the front end portion of the grounding electrode 2. Thus, the spark plug 1 is produced.

The spark plug according to the present invention is used as an igniter plug of automotive internal combustion engines such as gasoline engine. The screw portion 9 is threadably mounted on a screw hole provided in a head (not shown) partitioning and forming a combustion chamber of internal combustion engines, and is fixed to a given position. The spark plug according to this invention can be used in any internal combustion engines. The alumina-based sintered body forming the insulator 3 has excellent grinding processability of an unburned molded article, can shape into desired shape and size with high productivity, and has excellent withstand voltage characteristics and strength at high temperature when forming an insulator. Therefore, the spark plug 1 according to this invention can preferably be used in internal combustion engines having high power, requiring a spark plug including an insulator having decreased thickness.

The spark plug according to this invention is not limited to the above-described examples, and various modifications can be made in a scope that the object of the present invention can be achieved. For example, the spark plug 1 is arranged such that the front end surface of the center electrode 2 faces the surface of one end of the grounding electrode 6 in an axis line AX direction of the center electrode through the spark discharge gap G. However, in this invention, the spark plug may be arranged such that the side surface of the center electrode faces the front end surface of one end of the grounding electrode in a radius direction of the center electrode through the spark discharge gap. In this case, single or plural grounding electrodes facing the side surface of the center electrode may be provided.

The spark plug 1 includes the center electrode 2 and the grounding electrode 6. In this invention, a noble metal tip may be provided on the front end portion of the center electrode and/or the surface of the grounding electrode. The noble metal tip formed on the front end portion of the center electrode and the surface of the grounding electrode generally has a columnar shape, is adjusted to an appropriate size, and melt fixed to the front end portion of the center electrode and the surface of the grounding electrode by appropriate welding methods such as laser welding or electric resistance welding. The spark discharge gap is formed between the surface of the noble metal tip formed on the front end portion of the center electrode and the surface of the noble metal tip formed on the surface of the grounding electrode. The material forming the noble metal tip includes noble metals such as Pt, Pt alloy, Ir and Ir alloy.

EXAMPLES

Alumina powder (containing a slight amount of Na as unavoidable impurities) having an average particle diameter of 2.2 μm and a purity of 99.5% or more, $SiO$ powder having an average particle diameter of 2.8 μm and a purity of 99.5% or more, $MgCO_3$ powder having an average particle diameter of 6.0 μm and a purity of 99.5% or more, $CaCO_3$ powder having an average particle diameter of 2.0 μm and a purity of 99.5% or more, $BaCO_3$ powder having an average particle diameter of 5.0 μm and a purity of 99.5% or more, $SrCO_3$ powder having an average particle diameter of 2.0 μm and a purity of 99.5% or more, $La_2O_3$ powder having an average particle diameter of 9.0 μm and a purity of 99.5% or more, $CeO_2$ powder having an average particle diameter of 6.0 μm and a purity of 99.5% or more, and $Nd_2O_3$ powder having an average particle diameter of 4.0 μm and a purity of 99.5% or more were weighed and mixed in proportions ($MgCO_3$, $CaCO_3$, $BaCO_3$ and $SrCO_3$ as carbonate compounds are converted to the mass in terms of the respective oxides) becoming mass % in terms of oxide shown in Table 1. Thus, raw material powders were prepared.

Each of those raw material powders was introduced into a resin-made pot (volume: 2.4 liters), and mixed and pulverized using alumina pebbles having a diameter of 10 mm for 10 to 72 hours. A hydrophilic binder (2 parts by mass per 100 parts by mass of the raw material powder mixed and pulverized) was added to and mixed with the resulting mixture to prepare slurry. An average particle diameter of each slurry was measured with a laser diffraction method (LA-750, manufactured by HORIBA). The results are shown in Table 2. Each slurry was spray dried with a spray drying method, and granulated into a powder having an average particle diameter of about 100 μm by a laser diffraction method.

The powder granulated was molded into an unburned molded article having a diameter of 23 mm with an isostatic press of 100 MPa. The molded article was burned in the atmosphere at a burning temperature shown in Table 1 for a burning time shown in Table 1. Thus, an alumina-based sintered body was produced.

The ratio S/(S+A) of the content S (mass % in terms of oxide) of the Si component to the total content (S+A) of the content S and the content A (mass % in terms of oxide) of the Group 2 element (2A) component, and the ratio M/A of the content M (mass % in terms of oxide) of the Mg component to the content A (mass % in terms of oxide) of the Group 2 element (2A) component are shown in Table 1. The content of each component and the content ratios S/(S+A) and WA substantially corresponded with the mixing ratio in the raw material powders and the content (mass % in terms of oxide) of each component calculated by fluorescent X-ray analysis or chemical analysis of the alumina-based sintered body.

TABLE 1

| | Mass in terms of Oxide of Each Component (mass %) | | | | | | | | | Ratio of Contents | | Mixing Time | Sintering Condition | |
| | Al Component | Si Component | Group 2 Element Component | | | | Rare Earth Element (RE) Component | | | | | | Sintering Temperature | Sintering Time |
| | $Al_2O_3$ | $SiO_2$ | MgO | BaO | CaO | SrO | $La_2O_3$ | $CeO_2$ | $Nd_2O_3$ | S/(S + A) | M/A | (h) | (° C.) | (h) |
| Ex. 1 | 92.42 | 3.83 | 0.03 | 0.82 | 0.94 | — | 1.96 | — | — | 0.68 | 0.016 | 18 | 1700 | 1 |
| Ex. 2 | 97.13 | 1.41 | 0.03 | 0.42 | 0.23 | — | — | — | 0.78 | 0.68 | 0.046 | 72 | 1575 | 5 |
| Ex. 3 | 92.65 | 3.30 | 0.16 | 1.38 | 0.58 | — | 1.93 | — | — | 0.61 | 0.077 | 36 | 1600 | 2 |
| Ex. 4 | 97.53 | 1.20 | 0.01 | 0.35 | 0.24 | — | 0.67 | — | — | 0.67 | 0.015 | 42 | 1550 | 8 |
| Ex. 5 | 94.84 | 2.62 | 0.23 | 0.37 | 0.50 | — | 1.44 | — | — | 0.70 | 0.208 | 22 | 1600 | 7 |

TABLE 1-continued

| | Mass in terms of Oxide of Each Component (mass %) | | | | | | | | | | | Sintering Condition | |
|---|---|---|---|---|---|---|---|---|---|---|---|---|---|
| Al Component | Si Component | Group 2 Element Component | | | | Rare Earth Element (RE) Component | | | Ratio of Contents | | Mixing Time | Sintering Temperature | Sintering Time |
| $Al_2O_3$ | $SiO_2$ | MgO | BaO | CaO | SrO | $La_2O_3$ | $CeO_2$ | $Nd_2O_3$ | S/(S+A) | M/A | (h) | (° C.) | (h) |
| Ex. 6 | 93.41 | 3.40 | 0.36 | 0.23 | 0.72 | — | 1.87 | — | — | 0.72 | 0.276 | 10 | 1675 | 8 |
| Ex. 7 | 95.66 | 2.14 | 0.16 | 0.57 | 0.28 | — | 1.18 | — | — | 0.68 | 0.159 | 28 | 1550 | 5 |
| Ex. 8 | 94.91 | 2.63 | 0.28 | 0.18 | 0.55 | — | 1.44 | — | — | 0.72 | 0.276 | 54 | 1650 | 3 |
| Ex. 9 | 94.70 | 2.61 | 0.20 | 0.70 | 0.35 | — | 1.44 | — | — | 0.68 | 0.159 | 18 | 1550 | 7 |
| Ex. 10 | 94.84 | 2.63 | 0.38 | 0.43 | 0.30 | — | 1.43 | — | — | 0.70 | 0.343 | 17 | 1600 | 3 |
| Ex. 11 | 94.25 | 2.86 | 0.38 | 0.77 | — | 0.30 | 1.44 | — | — | 0.66 | 0.262 | 20 | 1600 | 3 |
| Ex. 12 | 94.48 | 2.63 | 0.30 | 0.51 | 0.64 | — | — | 1.44 | — | 0.64 | 0.207 | 15 | 1580 | 6 |
| C. Ex. 1 | 96.08 | 2.65 | 0.20 | 0.71 | 0.35 | — | — | — | — | 0.68 | 0.159 | 24 | 1620 | 8 |
| C. Ex. 2 | 95.25 | 1.84 | 1.47 | — | — | — | 1.44 | — | — | 0.56 | 1.000 | 42 | 1700 | 5 |
| C. Ex. 3 | 94.47 | 2.35 | 0.13 | 1.13 | 0.48 | — | 1.44 | — | — | 0.57 | 0.077 | 36 | 1600 | 4 |
| C. Ex. 4 | 94.64 | 2.59 | 0.10 | 0.87 | 0.36 | — | 1.44 | — | — | 0.66 | 0.077 | 40 | 1500 | 1 |

Bulk density of each alumina-based sintered body thus obtained was obtained according to the measurement method of "bulk density $\sigma_b$" defined in JIS R1634 (1998), and the measurement results are shown in Table 2.

Figure 3:
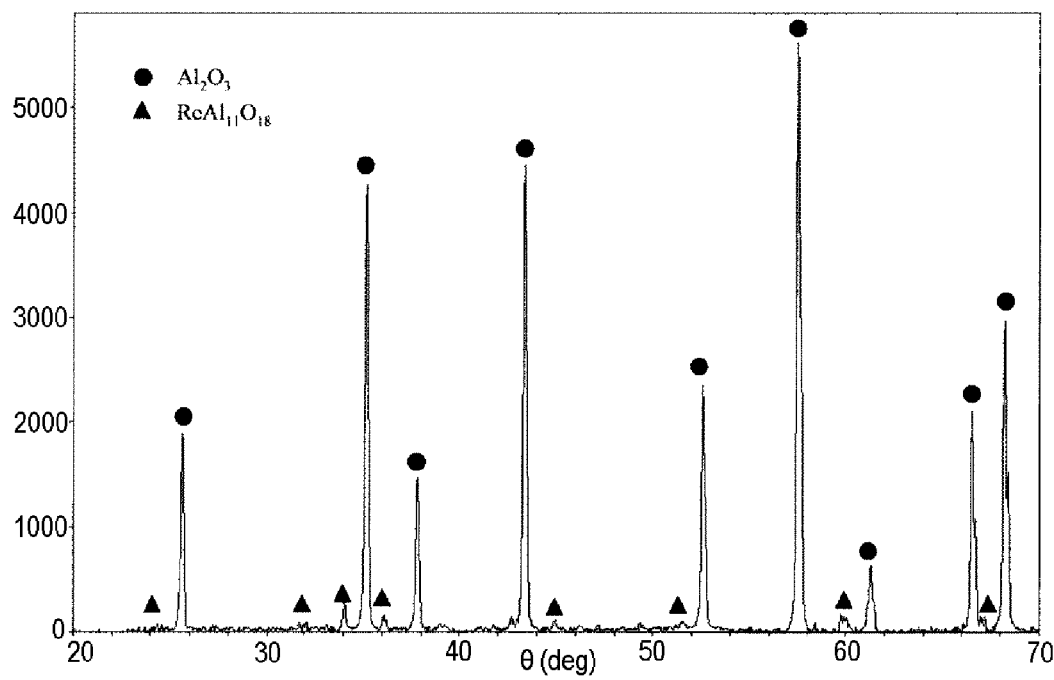
FIG. 3 is X-ray diffraction chart of the alumina-based sintered body (Example 7) having crystals of La-β-alumina structure ($LaAl_{11}O_{18}$).

The surface of each alumina-based sintered body was subjected to X-ray diffraction, and the presence or absence of a crystal phase having La-β-alumina structure was judged by whether or not spectrum corresponding to JCPDS card No. 33-699 of La-β-alumina is present. Furthermore, comparing with the JCPDS card, the presence or absence of crystal phases of Ce-β-alumina and Nd-β-alumina were judged. The results are shown in Table 2. X-ray diffraction chart of the alumina-based sintered body (Example 7) having a crystal of La-β-alumina structure ($LaAL_{11}O_{18}$) is shown in FIG. 3.

The surface of each alumina-based sintered body was mirror-polished, and the polished surface was subjected to a thermal etching treatment at a temperature 100° C. lower than the burning temperature shown in Table 1 for 10 minutes. The treated surface was observed with a scanning electron microscope (SEM), and an average crystal particle diameter $D_A(Al)$ of alumina crystal was measured with an intercept method as described before. Furthermore, the surface of each of the alumina-based sintered bodies of Examples 8 to 10 and Comparative Examples 2 to 4 was observed with a scanning electron microscope (SEM). A diameter of a circle corresponding to a "light color region" extracted was calculated as described before, and the diameter was used as a crystal particle diameter $D_E(RE)$ of RE-β-alumina crystal phase. Furthermore, an arithmetic average value of the crystal particle diameter $D_E(RE)$ was used as an average crystal particle diameter $D_A(RE)$ of RE-β-alumina crystal phase. $D_A(RE)/D_A(Al)$ was obtained from the average crystal particle diameter $D_A(Al)$ of alumina crystal thus calculated, and the crystal particle diameter $D_E(RE)$ and the average crystal particle diameter $D_A(RE)$ of RE-β-alumina crystal phase. The number of the RE-β-alumina crystal phases becoming $D_E(RE)/D_A(Al) \geq 2$ was counted. Those results are shown in Table 2. The symbol "—" of Examples 12 and Comparative Example 1 in Table 2 shows that the RE-β-alumina crystal phase was not present and therefore was not calculated.

The RE-β-alumina crystal phase present on each of the alumina-based sintered bodies obtained in Examples 7 to 9 and 12 and Comparative Examples 2 to 4 was subjected to elemental analysis under the above-described measurement conditions using an energy dispersion X-ray analyzer (EDX) attached to a transmission electron microscope (TEM), and the composition of RE-β-alumina crystal phase was confirmed. As a result, the composition of Example 7 was $LaAl_{11}O_{18}$, the composition of Example 8 was $LaMg_{2.3}Al_{16}O_{23}$, and the composition of Example 9 was $LaMgAl_{13}O_{19}$. Furthermore, the composition of Comparative Example 2 was $LaMg_3Al_{17}O_{30}$, the composition of Comparative Example 3 was $LaMgAl_{13}O_{19}$, and the composition of Comparative Example 4 was $LaAl_{11}O_{18}$.

(Withstand Voltage Characteristics)

Figure 2:
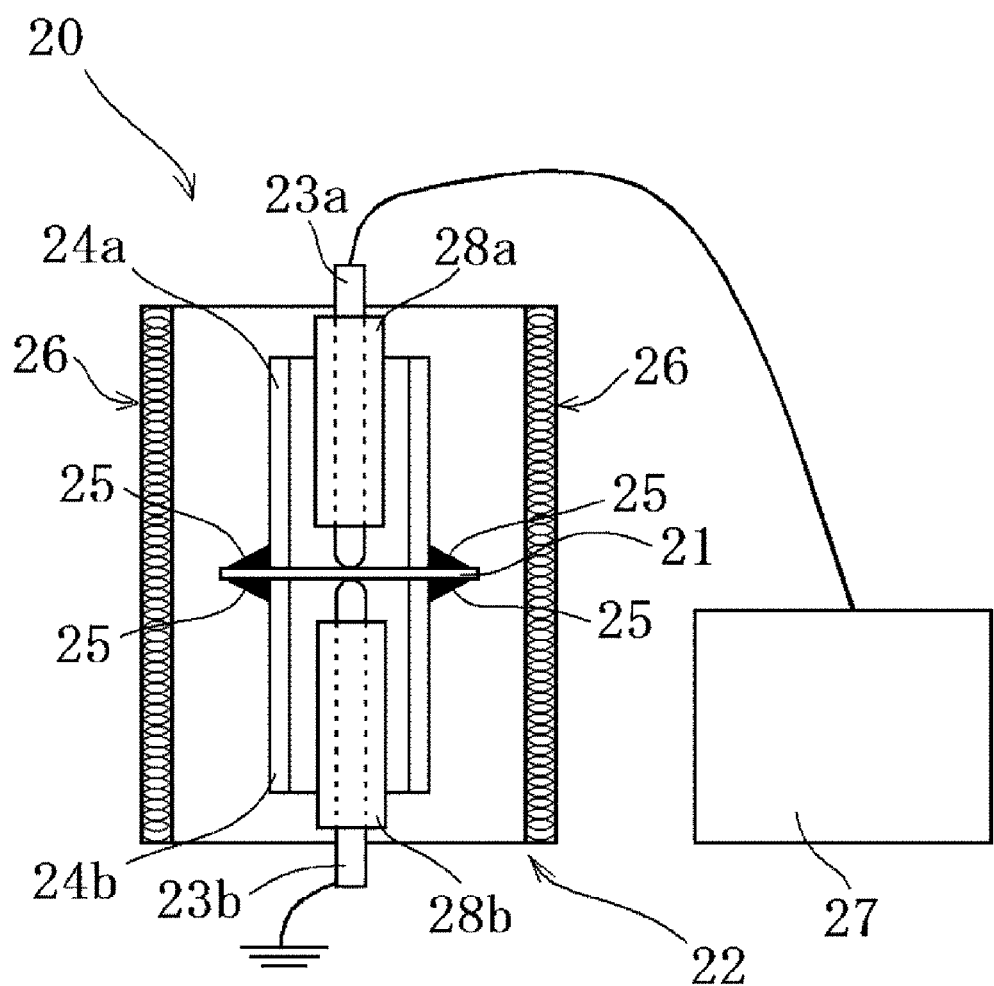
FIG. 2 is a schematic sectional view showing an outline of a withstand voltage measuring device.

A disc-shaped test piece having a diameter of 18 mm and a thickness of 0.6 mm was prepared in the same manner as the production of the alumina-based sintered body, and withstand voltage value at 700° C. was measured using a withstand voltage measuring device 20 shown in FIG. 2. As shown in FIG. 2, the withstand voltage measuring device 20 is that in a heating box 22, a disc-shaped test piece 21 is sandwiched between an electrode 23a connected to a high voltage generating device (CDI power source) and an electrode 23b grounded from an axis line direction of the disc-shaped test piece 21 in the axis line direction. Furthermore, the disc-shaped test piece 21 is sandwiched between alumina-made insulator cylinders 24a and 24b so as to surround the electrode 23a and the electrode 23b from an axis line direction of the disc-shaped test piece 21 in the axis line direction. The contact portions between the front and back surfaces of the disc-shaped test piece and the alumina-made insulator cylinders 24a and 24b are fixed with a $SiO_2$ type sealing glass 25 over the entire periphery of the insulator cylinders 24a and 24b. In the electrode 23a and electrode 23b, the front end portion contacting the disc-shaped test piece 21 has a taper shape in which a diameter is gradually narrowed toward the front end portion. The contact area to the disc-shaped test piece 21 was about 0.75 $mm^2$. The electrodes 23a and 23b have the periphery covered with the alumina-made insulator cylinders 28a and 28b to prevent generation of discharge between the respective electrode and the heating box 22. Using the withstand voltage measuring device 20, a constant high voltage was applied to the disc-shaped test piece 21 with a high voltage generating device 27 that can apply high voltage of several ten kV to the disc-shaped test piece 21 in the heating box 22 adjusted to 700° C. by an electric heater, and voltage value when breakdown was generated in the disc-shaped test piece 21 was measured as "withstand voltage value" of the disc-shaped test piece 21. The results are shown in Table 2.

(Strength at High Temperature)

Test pieces of 48 mm×4 mm×3 mm were prepared in the same manners as the productions of the alumina-based sintered bodies, respectively. Three-point bend strength at 700° C. (span 30 mm, shown as strength at high temperature in Table 2) was measured according to the measurement method defined in JIS R1604. The results are shown in Table 3.

(Grinding Processability)

Ten test samples of the unburned molded articles molded by isostatic press were prepared in the same manner as the production of the alumina-based sintered body, respectively. Peripheries of ten test samples of those unburned molded articles were ground with resinoid wheel under the same conditions, and the mass of all of ten test samples of the unburned molded articles was measured. Difference in mass between the first ground unburned molded article (first test sample) and the finally ground unburned molded article (tenth test sample) was obtained from the first test sample and the tenth test sample, and grinding processability was evaluated. The case that the difference in mass is large shows that the surface of the resinoid wheel is clogged with the unburned molded article, and as a result, the tenth test sample of the unburned molded article is not ground as desired. This case means that grinding processability is poor. When the difference in mass is 3 g or less, the molded article can be grinding-processed by an industrially inexpensive method, and the unburned molded article has excellent grinding processability. This case is indicated as "O" in Table 2. When the difference in mass exceeds 3 g, the molded article is difficult to be grinding-processed by an industrially inexpensive method, and the unburned molded article has poor grinding processability. This case is indicated as "X" in Table 2.

than 52 kV/mm. In particular, when the RE-β-alumina crystal phase was satisfied with at least one of the conditions (1) and (2), the alumina-based sintered bodies had high withstand voltage value and high strength at high temperature. Furthermore, the alumina-based sintered bodies (Examples 3 and 5 to 12) in which the content ratio M/A in the Group 2 element (2A) component is fallen within a range of 0.050 to 0.45 had the withstand voltage value higher than 57 kV/mm. The alumina-based sintered bodies (Examples 3 and 5 to 12) in which the alumina content is fallen within a range of 92.5 to 97.0 mass % had the withstand voltage value higher than 57 kV/mm.

Contrary to this, the alumina-based sintered body (Comparative Example 1) which does not contain the rare earth element (RE) component had large average crystal particle diameter $D_A(Al)$ and slurry average particle diameter and had excellent grinding processability of the unburned molded article. However, withstand voltage value was small and strength at high temperature was low. The alumina-based sintered body (Comparative Example 2) in which only one kind of MgO is contained as the Group 2 element (2A) component in a proportion that the content ratio S/(S+A) is less than 0.60 had excellent grinding processability of the unburned molded article. However, withstand voltage value was small and strength at high temperature was low. The alumina-based sintered body (Comparative Example 3) in which the above components are contained in a proportion

TABLE 2

| | Average Crystal Particle Diameter (μm) | | RE-β-Alumina Crystal Phase Presence/ | | | | Number of Crystal Particle satisfying | | Bulk Density | Average Particle Diameter of Slurry | Withstand Voltage Value | Strength at High Temperature | Cutting Process- |
|---|---|---|---|---|---|---|---|---|---|---|---|---|---|
| | $D_A(Al)$ | $D_A(RE)$ | Absence | x | y | z | $D_A(RE)/D_A(Al)$ | $D_e(RE)/D_A(Al) \geq 2$ | (g/cm³) | (μm) | (kV/mm) | (MPa) | ability |
| Ex. 1 | 3.10 | — | Presence | | | | | | 3.81 | 1.52 | 54 | 301 | O |
| Ex. 2 | 2.40 | — | Presence | | | | | | 3.81 | 1.81 | 52 | 310 | O |
| Ex. 3 | 2.00 | — | Presence | | | | | | 3.80 | 1.76 | 57 | 303 | O |
| Ex. 4 | 2.60 | — | Presence | | | | | | 3.79 | 1.80 | 58 | 306 | O |
| Ex. 5 | 3.20 | — | Presence | | | | | | 3.79 | 1.82 | 62 | 312 | O |
| Ex. 6 | 3.60 | — | Presence | | | | | | 3.78 | 1.68 | 60 | 320 | O |
| Ex. 7 | 3.40 | — | Presence | 0 | 11 | 18 | | | 3.83 | 1.73 | 62 | 309 | O |
| Ex. 8 | 3.30 | 8.9 | Presence | 2.3 | 16 | 27 | 2.7 | 0 | 3.80 | 1.81 | 65 | 306 | O |
| Ex. 9 | 3.50 | 0.7 | Presence | 1 | 13 | 19 | 0.2 | 1 | 3.80 | 1.78 | 66 | 316 | O |
| Ex. 10 | 2.70 | 4.0 | Presence | | | | 1.5 | 0 | 3.82 | 1.68 | 68 | 311 | O |
| Ex. 11 | 2.40 | — | Presence | | | | | | 3.80 | 1.66 | 58 | 311 | O |
| Ex. 12 | 2.60 | — | Absence | — | — | — | — | — | 3.81 | 1.59 | 50 | 302 | O |
| C. Ex. 1 | 3.20 | — | Absence | — | — | — | — | — | 3.77 | 1.82 | 44 | 177 | O |
| C. Ex. 2 | 2.80 | 9.0 | Presence | 3 | 17 | 30 | 3.2 | 4 | 3.80 | 1.89 | 40 | 268 | O |
| C. Ex. 3 | 2.20 | 0.22 | Presence | 1 | 13 | 19 | 0.1 | 0 | 3.68 | 1.23 | 46 | 224 | X |
| C. Ex. 4 | 1.46 | 6.6 | Presence | 0 | 11 | 18 | 4.5 | 7 | 3.69 | 1.01 | 41 | 183 | X |

As shown in Table 2, the alumina-based sintered bodies (Examples 1 to 12) containing the above components in the proportions such that the content ratio S/(S+A) is 0.60 or more, and having an average crystal particle diameter $D_A(Al)$ of 1.50 μm or more had high withstand voltage value of 50 kV/mm or more and high strength at high temperature of 300 MPa or more, and further had excellent grinding processability of the unburned molded article.

Furthermore, in Examples 1 to 12 containing three components, that is, Mg component, Ba component and other one element component other than those, as the Group 2 element (2A) component, the alumina-based sintered bodies (Examples 1 to 11) in which the rare earth element (RE) component is La component or Nd component and RE-β-alumina crystal phase is present had a withstand voltage value higher that the content ratio S/(S+A) is less than 0.60 was that sinterability is decreased, bulk density is low, and withstand voltage characteristics and strength at high temperature are low. Furthermore, because the average particle diameter of the slurry is finer than 1.4 μm, clogging of resinoid wheel was remarkable and grinding processability of the unburned molded article was poor. The alumina-based sintered body (Comparative Example 4) in which burning conditions are not matched and crystals having the average crystal particle diameter $D_A(Al)$ of less than 1.50 μm are present had poor processability of the unburned molded article. Additionally, because densification of the alumina-based sintered body does not proceed sufficiently, bulk density was low, and withstand voltage characteristics and strength at high temperature were low. Furthermore, as shown in Table 2, Comparative Examples 2 and 4 were not satisfied with all of the conditions (1) and (2). In particular, despite that Comparative Example 4 contains Mg component, Ba component and Ca component as the Group 2 element (2A) component, Comparative Example 4 was not satisfied with all of the conditions (1) and (2), and strength at high temperature was small.

(Average Particle Diameter of Slurry and Grinding Processability)

The influence of the average particle diameter of slurry affecting grinding processability was investigated. Four kinds of slurries each having an average particle diameter measured by a laser diffraction method (LA-750, manufactured by HORIBA) of 0.5 μm, 1.4 μm, 1.8 μm and 2.0 μm were prepared. Using those slurries, every ten test samples were produced in basically the same manner as Example 1. Specific modification points were that alumina pebbles having a diameter of 20 mm were used, the amount of the hydrophilic binder used was 0.2 mass % based on the total mass of the raw material powder, water was used as a solvent together with the hydrophilic binder, and the powder was rubber-pressed with 100 MPa. Regarding the unburned molded articles thus molded, difference in mass between the first test sample and the tenth test sample was obtained in the same manner as the grinding processability, and grinding processability of the unburned molded article was evaluated. As a result, all of the unburned molded articles produced from slurries having an average particle diameter of 1.4 μm, 1.8 μm and 2.0 μm did not substantially have the difference in mass, and had excellent grinding processability. On the other hand, the unburned molded article produced from the slurry of 0.5 μm had a large difference in mass of about 20%. It is understood from those results and the results of the grinding processability that when the average particle diameter of the slurry is 1.4 μm ore more, in short, when the crystal particle diameter $D_A(Al)$ of the alumina-based sintered body obtained by sintering the slurry is 1.5 μM or more, the unburned molded article has excellent grinding processability of the unburned molded article.

<Production of Spark Plug 1>

Using Ni-base alloy, a wire rod having a sectional size of 1.6 mm×2.7 mm was prepared as the grounding electrode 6 according to the ordinary method. The columnar inner member 8 comprising copper and the outer member 7 formed by the Ni-based alloy in a cup shape were prepared, respectively. The inner member 8 prepared was inserted in the outer member 7 prepared, and the center electrode 2 having a diameter of 4 mm comprising the inner member 8 and the outer member 7 was prepared by plastic processing such as extrusion processing. One end portion of the grounding electrode 6 was joined to an end surface of the metal shell 4 formed into given shape and size (particularly, nominal diameter of a screw portion is 10 mm) by plastic processing and rolling processing, with electric resistance welding. An insulator 3 including the alumina-based sintered body was prepared in the same manner as in Examples 1 to 12. The insulator 3 is prepared by granulating the raw material powder, molding the granulated powder into a molded article with isotactic press, passing through a grinding-shaping step which grinds and shapes the molded article before burning, and burning the molded article. The center electrode 2 was assembled to the insulator 3, and the insulator 3 was assembled to the metal shell 4 having the grounding electrode 6 joined thereto. The front end portion of the ground electrode 6 was bent to the center electrode 2 side, so that one end of the grounding electrode 6 faced the front end portion of the center electrode 2. Thus, a spark plug 1 was produced. The spark plug 1 thus produced had the same effect as in Table 2. Thus, the alumina-based sintered body has excellent processability of the unburned molded article and is particularly preferred as an insulator used in a spark plug including an insulator 3 having small size and decreased thickness, and an insulator used in a spark plug for internal combustion engines having high power. The spark plug including the insulator 3 formed by the alumina-based sintered body exhibited high withstand voltage characteristics and high strength at high temperature, at high temperature of about 700° C. even though the thickness of the insulator is decreased and the spark plug is used for internal combustion engines having high power. In Particular, each spark plug including the insulator 3 prepared in the same manner as in Examples 3 and 5 to 12 exhibited higher withstand voltage value and higher strength at high temperature in addition to the above characteristics.

The invention claimed is:

1. A spark plug comprising:
a center electrode;
a substantially cylindrical insulator provided on a periphery of the center electrode; and
a grounding electrode arranged such that one end thereof faces the center electrode through a spark discharge gap,
wherein the insulator comprises a dense alumina-based sintered body having an average crystal particle diameter $D_A(Al)$ of 1.50 μm or more, and
wherein the alumina-based sintered body contains Si component, a Group 2 element (2A) component containing Mg and Ba as essential components and further containing at least other one element excluding Mg and Ba in Group 2 elements in a periodic table based on a recommendation of IUPAC 1990, and a rare earth element (RE) component, such that a ratio of a content S (mass % in terms of oxide) of the Si component to a total content (S+A) of the content S and a content A (mass % in terms of oxide) of the Group 2 element (2A) component is 0.60 or more.

2. The spark plug according to claim 1, wherein the Group 2 element (2A) component is contained such that a ratio of a content M (mass % in terms of oxide) of the Mg component to the content A is from 0.050 to 0.45.

3. The spark plug according to claim 1,
wherein the rare earth element (RE) component is at least one component selected from a group consisting of La component, Pr component and Nd component, and
wherein the alumina-based sintered body has RE-β-alumina crystal phase containing at least the rare earth element (RE) component, and an average crystal particle diameter $D_A(RE)$ of the RE-β-alumina crystal phase and the average crystal particle diameter $D_A(Al)$ of alumina are satisfied with a following condition (1):

Condition (1): $0.2 \leq D_A(RE)/D_A(Al) \leq 3.0$.

4. The spark plug according to claim 1,
wherein the rare earth element (RE) component is at least one component selected from a group consisting of La component, Pr component and Nd component, and
wherein the alumina-based sintered body has RE-β-alumina crystal phases containing at least the rare earth element (RE) component, and of the RE-β-alumina crystal phases, the number of RE-β-alumina crystal phases in which its crystal particle diameter $D_E(RE)$ and an average crystal particle diameter $D_A(Al)$ of alumina are satisfied with a following condition (2) is 3 or less:

Condition (2): $D_E(RE)/D_A(Al) \geq 2$.

5. The spark plug according to claim 3, wherein the RE-β-alumina crystal phase has a composition represented by the compositional formula:

$RE(2A)_x(Al)_yO_z$ (wherein x, y and z are x=0 to 2.5, y=11 to 16 and z=18 to 28, respectively).

6. The spark plug according to claim 1, wherein the alumina-based sintered body contains the Al component in an amount of 92.5 mass % to 97.0 mass % when a whole mass of the alumina-based sintered body is defined as 100 mass %.

7. The spark plug according to claim 1, wherein the insulator is held on a metal shell, and a nominal diameter of a screw portion formed on a periphery of the metal shell is 10 mm or less.

8. A method for manufacturing the spark plug according to claim 1, wherein the insulator is prepared through a grinding-shaping process of grinding the insulator before burning to shape the same.

* * * * *